United States Patent
Jambor

[11] Patent Number: 6,053,568
[45] Date of Patent: Apr. 25, 2000

[54] CEILING FOR A LAMELLA-TYPE SLIDING ROOF OF A MOTOR VEHICLE

[75] Inventor: Arno Jambor, Vaihingen, Germany

[73] Assignee: DaimlerChrylser AG, Stuttgart, Germany

[21] Appl. No.: 09/075,873

[22] Filed: May 12, 1998

[30] Foreign Application Priority Data

May 13, 1997 [DE] Germany .......................... 197 20 000

[51] Int. Cl.⁷ .................................................. B60J 7/047
[52] U.S. Cl. ...................... 296/213; 296/214; 296/220.01
[58] Field of Search .................................. 296/214, 213, 296/220.01, 107.06

[56] References Cited

U.S. PATENT DOCUMENTS 5,149,170  9/1992  Matsubara et al. .................. 29/213
5,335,961  8/1994  Reinsch et al. .................... 296/213

FOREIGN PATENT DOCUMENTS 39 03 035 A1  of 0000  Germany .
43 27 264 C1  of 0000  Germany .
3248413       7/1983   Germany .............. 296/214

*Primary Examiner*—Dennis H. Pedder
*Attorney, Agent, or Firm*—Evenson McKeown Edwards & Lenahan, P.L.L.C.

[57] ABSTRACT

A lamella-type sliding roof of a motor vehicle, has lamellae which, when the roof is, open, are tilted upward in a spaced manner with respect to one another and, particularly with respect to their closed position, are pushed on one another in a distance-reducing manner. A vehicle ceiling which is deformable and exercises a sealing function in a particularly simple and effective manner irrespective of the momentary position of the lamellae in their displacement direction extends in each case exclusively in an area situated below them. For this purpose, the deformable vehicle ceiling is constructed as a foil leading transversely to the displacement direction of the lamellae continuously into a dirt and water removal groove.

8 Claims, 2 Drawing Sheets

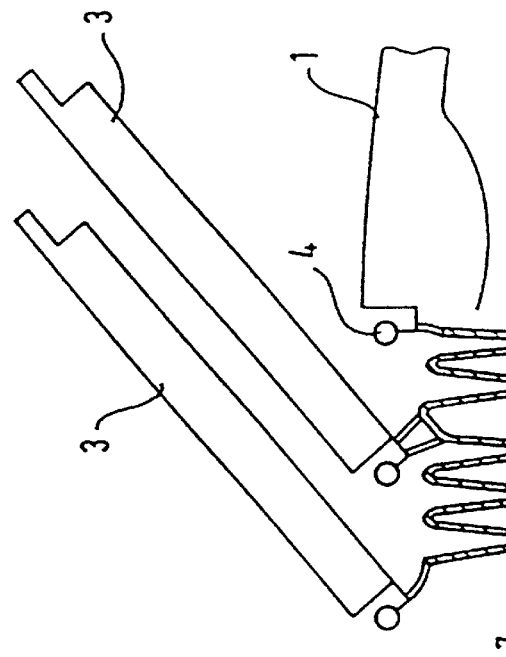
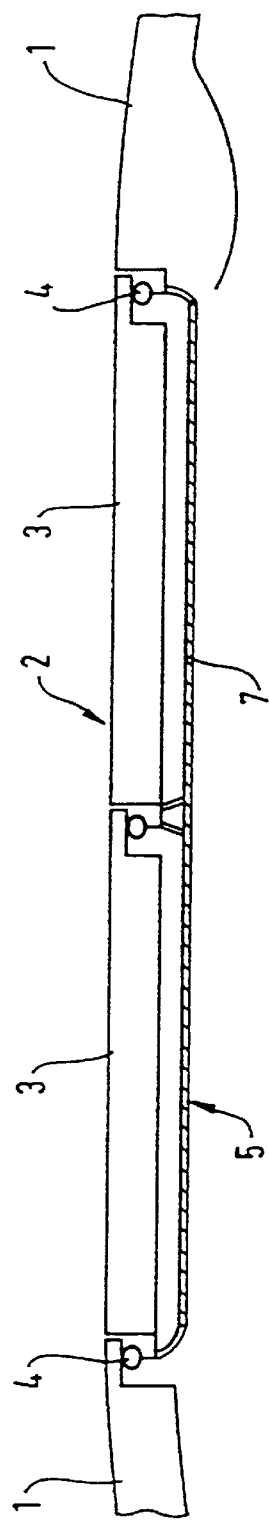
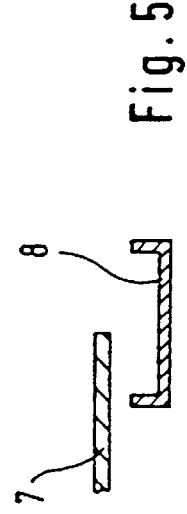
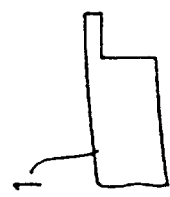

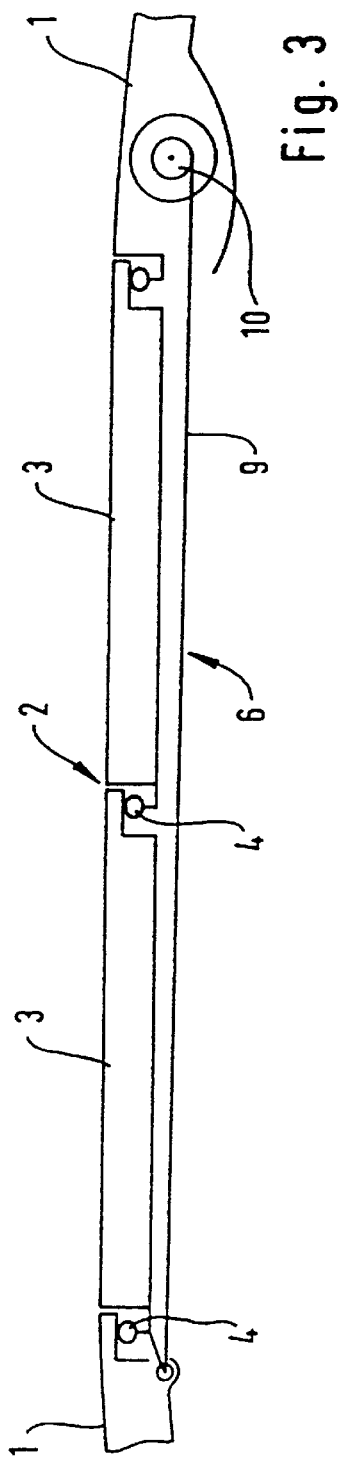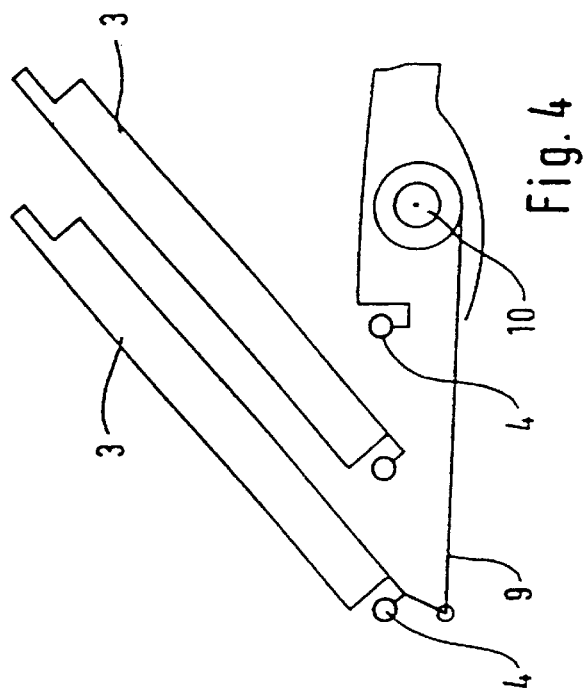

CEILING FOR A LAMELLA-TYPE SLIDING ROOF OF A MOTOR VEHICLE

BACKGROUND AND SUMMARY OF THE INVENTION

This application claims the priority of German application 197 20 000.1, filed May 13, 1997, the disclosure of which is expressly incorporated by reference herein.

The present invention relates to a ceiling for a lamella-type sliding roof of a motor vehicle, and more particularly, to a ceiling having lamellae which, when the roof is open, are tilted upward in a spaced manner with respect to one another and, particularly with respect to their closed position, are pushed on one another in a distance-reducing manner, which extends, independently of the momentary position of the lamellae in their displacement direction. The ceiling, exclusively in an area situated below the lamellae, is deformable and exercises a sealing function.

A ceiling for a lamella-type sliding roof is described in DE 43 27 264 C1. There, the deformable vehicle ceiling consists of U-shaped grooves which are arranged in the longitudinal direction of the lamellae and which are connected with one another in the displacement direction by foldable foil material. At their ends, the grooves lead into dirt removal and water draining grooves fixedly mounted below the vehicle roof. The U-shaped grooves which extend along the lamellae are assigned to the lamellae such that water flowing off from the gaps between the upright lamellae or dirt falling down from the gaps between the upright lamellae must penetrate in a targeted manner only into the U-grooves. For this purpose, seals are provided between the lamellae and the longitudinal edges of the U-shaped grooves.

The device has a complicated construction. Furthermore, as a result of improperly operating seals between the edges of the U-shaped grooves and the lamellae, water and/or dirt can penetrate into the vehicle interior. This is possible because the foldable foil between the U-shaped grooves on its lateral longitudinal edges does not lead into the dirt and water removal groove into which the U-shaped grooves lead.

An object of the present invention is to provide a vehicle ceiling as simply as possible and with a secure sealing function.

One advantageous solution to achieve this object is by providing a deformable vehicle ceiling constructed as a foil which leads transversely to the displacement direction of the lamellae continuously into a dirt and water-removal groove.

The present invention is based on the recognition that it is advantageous to provide, below the lamellae to be tilted up, an additional sealing plane which is as simple as possible and which, when the lamella-type sliding roof is closed, is a visually attractive vehicle ceiling. A vehicle ceiling is particularly advantageous which, when the lamella-type roof is opened up, is simply rolled up in a shade-type manner. Such a shade-type vehicle ceiling is known per se from DE 39 03 035 A1 in a vehicle sliding roof. However, that known construction, the shade only carries out a visual function; i.e., when the sliding roof is closed, it is to form an aesthetically attractive vehicle ceiling. In contrast to the shade according to the present invention, the known shade is not configured used for the removal of dirt and water during the opening of the sliding roof.

BRIEF DESCRIPTION OF THE DRAWINGS

Other objects, advantages and novel features of the present invention will become apparent from the following detailed description of the invention when considered in conjunction with the accompanying drawings wherein:

FIG. 1 is a schematic, partial cross-sectional side view of a lamella-type sliding roof with a foldable vehicle roof which interacts with this lamella-type sliding roof and which is in the closed condition;

FIG. 2 is a schematic side view of the lamella-type sliding roof according to FIG. 1 in the opened condition;

FIG. 3 is a schematic side view of a lamella-type sliding roof in the representation of FIG. 1 with a shade as the vehicle ceiling, in the closed condition;

FIG. 4 is a schematic side view of the lamella-type sliding roof of FIG. 3, but in the opened condition; and FIG. 5 is a schematic view of the side outlet of the deformable vehicle ceiling into a dirt and water removal groove.

DETAILED DESCRIPTION OF THE DRAWINGS

A lamella-type sliding roof 2 is provided in a vehicle roof 1 and includes two lamella which can be displaced with respect to one another and can also be tilted up. The construction and the function of the lamella-type sliding roof 2 are conventional, as, for example, similar to that of the lamella-type sliding roof described in DE 43 27 264 C1. Instead of the illustrated two lamellae, an arbitrary number of lamellae can be provided as well.

The individual lamellae 3 are sealed off with respect to one another and with respect to the edge of the roof opening by seals 4 in a so-called first sealing plane. A so-called second sealing plane situated underneath is formed by the vehicle ceiling designated generally by the numeral 5 (FIGS. 1 and 2) or by the numeral 6 (FIG. 3 and 4) which can be deformed according to the present invention.

The vehicle ceiling 5 is a foldable vehicle ceiling which consists of a water-proof foil 7. This foil is linked in an articulated manner to those longitudinal edges of the lamellae 3 about which the lamellae 3 are swivelled for being tilted upright. In addition, the foil 7 is fixedly and tightly connected with that edge of the vehicle roof opening onto which the lamella-type sliding roof 2 is pushed during the opening.

When the lamellae 3 are pushed on or tilted upwardly, the foil 7 is pushed together in a bellows-type manner. The foil can be provided with depressions and/or devices which are normally used for foils in order to obtain a defined bellows from thereby.

The lateral edges of the foil 7 are assigned, as seen in FIG. 5 to a dirt removal and water drainage groove 8 such that dirt and/or water can securely enter this drainage groove 8. These removal or drainage grooves 8 are connected in a known manner with a channel system which leads outside the vehicle.

The respective articulated mounting of the foil 7 onto the individual lamellae 3, during the opening of the lamella-type sliding roof 2, automatically pushes the foil-type vehicle ceiling 5 together to form bellows as seen in FIG. 2. The assignment of the foil 7 on its lateral edges to one removal groove 8, respectively, is such that, also in this bellows-type pushed-together condition, a reliable removal of water and dirt into the lateral drainage grooves 8 can take place.

In the embodiment of FIGS. 3 and 4, the deformable vehicle ceiling 6 is constructed as a shade which can be rolled up and has a water-proof foil 9. The rolling-up of the foil 9 takes place on a roller 10 in the area of the rear edge of the roof opening opposite which the lamella-type sliding roof 2 is pushed on. A spring acts upon or biases the roller 10 in order to ensure an automatic rolling-up of the shade 9 during the opening of the lamella-type sliding roof 2. On its end which is free with respect to the roller 10, the foil 9 is linked tightly to that lamella 3 of the lamella-type sliding roof 2 by which the lamella-type sliding roof 2 rests against that edge of the roof opening from which the lamella-type sliding roof 2 is opened. As in the embodiment of the vehicle ceiling 5 of FIGS. 1 and 2, the foil 9 is assigned on its lateral edges to one dirt and water removal groove 8 respectively such that dirt and water can always be reliably removed from the foil 9 into these removal grooves 8.

The sealing planes formed by the deformable vehicle ceiling 5, 6 are used mainly for collecting and removing water and/or dirt which, when the lamellae 3 are tilted upward, falls off these lamellae 3. Secondly, the second sealing plane reliably ensures that, as a result of damaged seals 4 on the lamellae 3 water and dirt will not penetrate into the vehicle interior through the second sealing plane. The constructions according to the present invention achieves the foregoing advantages in an absolutely reliable manner by simple and low-cost devices. The vehicle ceiling, which is deformable according to the invention and interacts with the lamella-type sliding roof, also represents a visually attractive solution in the closed condition.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A lamella-type sliding roof of a motor vehicle, comprising a deformable ceiling, lamellae, and means for allowing the lamellae to be tilted upward and spaced with respect to one another in an open position of the roof and to be moved relative to one another in a displacement direction in a distance-reducing manner toward a closed position of the roof, wherein the ceiling extends exclusively in an area situated below the lamellae independently of a position of the lamellae being in the open or closed position of the roof being deformable and configured to provide a sealing function, and the deformable ceiling comprises a foil extending transversely to the displacement direction of the lamellae into a continuous dirt and water removal groove.

2. The roof according to claim 1, wherein the foil is configured to be pushed together in a bellows-like manner.

3. The roof according to claim 1, wherein the foil is configured to be wound onto a roller arranged to be rotatably disposed on a rearward transverse edge of a sliding roof opening onto which the lamellae are pushed in an upright condition.

4. The roof according to claim 1, wherein an end of the foil is linked to one of the lamella so that the foil is moved during an opening of the roof.

5. The roof according to claim 2, wherein the foil is linked to at least two of the lamellae.

6. The roof according to claim 4, wherein the foil is configured to be pushed together in a bellows-like manner.

7. The roof according to claim 6, wherein the foil is configured to be wound onto a roller arranged to be rotatably disposed on a rearward transverse edge of the sliding roof opening.

8. The roof according to claim 4, wherein the foil is linked to at least two of the lamellae.

\* \* \* \* \*